United States Patent
Diehl et al.

(10) Patent No.: US 11,390,298 B2
(45) Date of Patent: Jul. 19, 2022

(54) SYSTEM AND METHOD FOR RESOLVING A CONDITION IN A VEHICLE

(71) Applicant: Pony AI Inc., Grand Cayman (KY)

(72) Inventors: Peter G. Diehl, Shanghai (CN); Robert Dingli, Cupertino, CA (US)

(73) Assignee: Pony AI Inc., Grand Cayman (KY)

(*) Notice: Subject to any disclaimer, the term of this patent is extended or adjusted under 35 U.S.C. 154(b) by 130 days.

(21) Appl. No.: 16/584,725

(22) Filed: Sep. 26, 2019

(65) Prior Publication Data
US 2021/0094562 A1  Apr. 1, 2021

(51) Int. Cl.
- *B60W 50/16* (2020.01)
- *B60W 40/08* (2012.01)
- *B60W 50/14* (2020.01)
- *B60W 50/00* (2006.01)

(52) U.S. Cl.
CPC ............ *B60W 50/16* (2013.01); *B60W 40/08* (2013.01); *B60W 2050/0025* (2013.01); *B60W 2050/0075* (2013.01); *B60W 2050/143* (2013.01); *B60W 2540/22* (2013.01); *B60W 2556/10* (2020.02)

(58) Field of Classification Search
CPC ................ B60W 50/16; B60W 40/08; B60W 2050/0025; B60W 2050/0089; B60W 2050/143; B60W 2540/22; B60K 28/06; Y02T 10/84; B60R 21/12
See application file for complete search history.

(56) References Cited

U.S. PATENT DOCUMENTS

| | | | |
|---|---|---|---|
| 6,286,882 B1* | 9/2001 | Rastetter | B60J 7/223 296/24.41 |
| 7,110,880 B2 | 9/2006 | Breed et al. | |
| 2003/0191568 A1 | 10/2003 | Breed | |
| 2011/0184579 A1 | 7/2011 | Nilsen et al. | |
| 2013/0054090 A1* | 2/2013 | Shin | B60K 28/06 701/36 |
| 2016/0244170 A1* | 8/2016 | Marini | B64D 11/0648 |
| 2017/0200449 A1* | 7/2017 | Penilla | G10L 15/063 |

* cited by examiner

*Primary Examiner* — Rachid Bendidi
*Assistant Examiner* — Andrew J Cromer
(74) *Attorney, Agent, or Firm* — Sheppard Mullin Richter & Hampton LLP

(57) ABSTRACT

Provided herein is a system and method for implementing one or more strategies in response to a condition inside a vehicle. The system comprises a sensor to capture data, one or more processors, and a memory storing instructions that cause the one or more processors to detect, based on the data, a condition in the vehicle, determine a level of severity of the condition, and determine one or more strategies in response to a determined level of severity of the condition. The system further implements the one or more strategies to resolve the condition.

17 Claims, 8 Drawing Sheets

SYSTEM AND METHOD FOR RESOLVING A CONDITION IN A VEHICLE

TECHNICAL FIELD

The present disclosure relates generally to vehicles equipped to resolve a condition inside the vehicle.

BACKGROUND

An autonomous vehicle (AV), also known as robotic car is a vehicle that is capable of sensing its environment and moving safely with little or no human input. The autonomous vehicle uses a combination of sensors including cameras and radar, along with artificial intelligence, to travel without a human operator. However, such an autonomous vehicle, since there is no driver or other persons, may not have an authority to respond to or control different kinds of conditions in the vehicle which may be dangerous if unresolved. The shortfalls are addressed by the present disclosures, which provides the vehicle with capability to not only detect a condition inside the vehicle, but also respond and implement strategies in response to various conditions in the vehicle, allowing the vehicle to execute a safe driving action without being disturbed by the condition.

SUMMARY

Described herein are methods and systems for resolving conditions, such as stressful conditions, inside a vehicle, determining strategies to resolve the conditions based on a level of severity of conditions. Various embodiments of the present disclosure provide a vehicle system comprising a sensor configure to capture data, one or more processors, and a memory storing instructions that, when executed by the one or more processors, may cause the one or more processors to perform, detecting based on the data, a condition in the vehicle, determining a level of severity of the condition, determining one or more strategies in response to the determined level of severity of the condition, and implementing the one or more strategies to resolve the condition.

In some embodiments, the condition may comprise a dispute, an oral argument, or a physical fight.

In some embodiments, the detecting the condition may comprise inferring, based on the data, a behavior of one or more persons in the vehicle.

In some embodiments, the determining the one or more strategies may comprise determining a first strategy in response to the determined level of severity of the condition, assessing whether the condition is resolved in response to the first strategy, and implementing a second strategy if the condition is determined to be unresolved.

In some embodiments, the one or more strategies may comprise a psychological method, a physical method, or a combination of the psychological method and the physical method. In some embodiments, the psychological method may comprise playing music, changing a color of an interior of the vehicle, releasing a scent inside the vehicle, or contacting one or more external systems to resolve the condition. In some embodiments, the changing the color of the interior of the vehicle further may comprise turning the color to ambient light. In some embodiments, the external system may be an interactive system. The external system may be configured to analyze a status of the condition, and produce, based on the analyzed status of the condition, an artificial voice.

In some embodiments, the physical method may comprise creating a physical barrier. In some embodiments, the creating the physical barrier may further comprise releasing a curtain or a wall to divide the interior of the vehicle. In some embodiments, the physical method may comprise rotating one or more occupied seats away from one or more other occupied seats.

In some embodiments, the instructions may cause the one or more processors stop, when the condition is determined to be resolved, the psychological method, the physical method, or the combination of the psychological and physical method.

In some embodiments, the instructions may further cause the one or more processors to notify authority if the condition is not resolved in response to the determined strategies.

Various embodiments of the present disclosure provide a method of resolving conditions, inside a vehicle, comprising capturing data from a sensor, determining, using the data, a level of severity of a condition in the vehicle, determining one or more strategies in response to the determined level of severity of the condition, and implementing the one or more strategies to resolve the condition. In some embodiments, the condition may comprise a dispute, an oral argument, or a physical fight.

In some embodiments, determining the one or more strategies in response to the determined level of the condition may further comprise determining a first strategy in response to the determined level of severity of the condition, assessing whether the condition is resolved in response to the first strategy, and implementing a second strategy if the condition is determined to be unresolved.

In some embodiments, the implementing the one or more strategies may comprise implementing a psychological method, a physical method, or a combination of the psychological method and the physical method. In some embodiments, the psychological method may further comprise playing music, changing a color of an interior of the vehicle, releasing a scent inside the vehicle, or contacting one or more external interactive systems to relax the one or more persons. In some embodiments, the physical method may comprise creating a physical barrier between the one or more persons.

In some embodiments, the method may further comprise stopping, when the condition is determined to be resolved, the psychological method, the physical method, or the combination of the psychological and physical method. In some embodiments, the method may further comprise determining a type of the condition, and in response to the condition being a dispute, analyzing a status of the dispute, and producing, based on the analyzed status of the dispute, an artificial voice.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Systems and methods are provided to detect and implement one or more strategies in response to a condition in the vehicle. The condition may be a dispute, an oral argument, or a physical fight. The system may detect levels of seriousness or severity of the condition in the vehicle, and determine a strategy in response to the determine level of seriousness or severity of condition.

In a preferred implementation, the strategy may include a psychological method or a physical method. The psychological method may include playing music, changing a color of interior of the vehicle, and the physical method may include creating a barrier between the objects (e.g., passengers) who may be under a stressful condition (e.g., having a dispute with one another). It can be readily appreciated that the system may implement not only one strategy, or but also multiple strategies at the same time. For instance, if the system detect a condition in the vehicle, the system may implement a psychological method (e.g., playing music) and execute a physical method (e.g., creating a wall barrier) at the same time such that the condition may be resolved faster.

In some implementations, the system may determine levels of seriousness of condition in the vehicle, and implement different strategies in response to different levels of seriousness or severity of the condition. If the condition is not serious in the vehicle, for example an oral dispute in the vehicle, the system may use a non-drastic method to resolve the condition. For instance, the system may first play music to test whether the condition is resolved. In some embodiments, the system may switch to a different strategy if the condition is not resolved. For example, if the condition of the oral argument remains the same by using the psychological method, the system may use a stronger or more drastic method (e.g., creating a physical barrier between the passengers) to resolve the condition. The system may also stop the implementation of any strategies when the condition is resolved.

Figure 1:
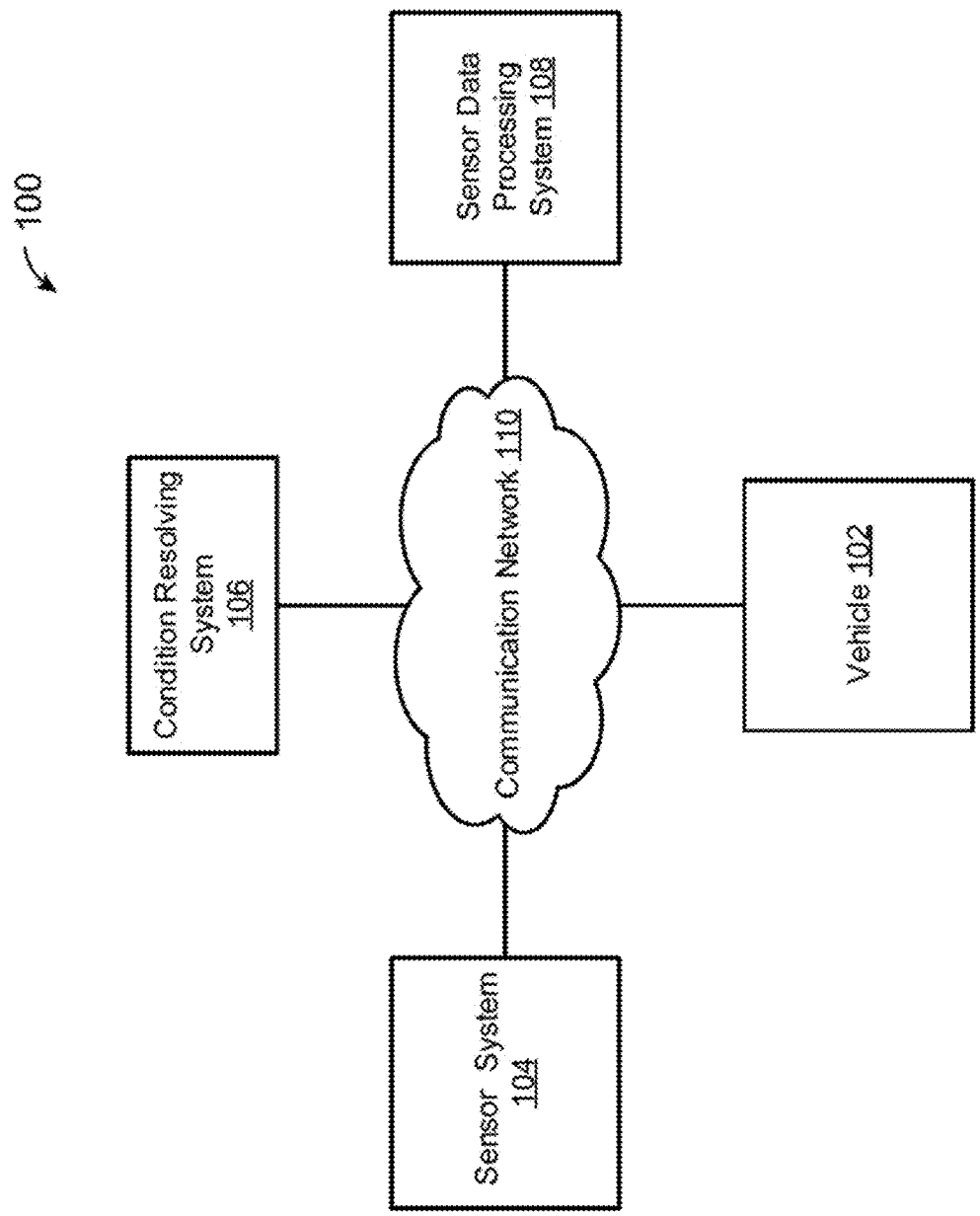
FIG. 1 depicts a diagram of an example system for adjustment vehicle conditions, in accordance with some embodiments.

In the example illustrated in FIG. 1, the vehicle system 100 may include a vehicle 102, a sensor system 104, a sensor data processing system 108, a condition resolving system 106, and a communication network 110. In some embodiments, the systems 104, 106, 108 and the communication network 110 may be implemented as part of the vehicle 102. The vehicle discussed herein may be vehicles that travel in the air (e.g., drones, helicopter, airplanes, and so on), travels on water (e.g., a boat), and/or the like. The vehicle discussed herein may accommodate one or more passengers therein.

In some embodiments, the sensor system may be mounted on one or more portions. The sensor system may be mounted on one or more portions (e.g., exterior surfaces, interior surfaces) of a vehicle, and may include a sensor, or one or more sensors. As used herein, sensors may include laser scanning systems (e.g., Lidar systems), radar systems, cameras, GPS, sonar, ultrasonic, IMU, and FIR (far infrared) sensors and/or the like. The sensor system may be configured to capture sensor data from different sensors. The different sensors may be sensors of a same or a different modality. The sensor data may include an image captured from the one or more sensors, one or more specific features (such as movement of passengers) extracted from the image. The sensor data may be further processed to obtain or estimate one or more parameters, and the like.

In some embodiments, the sensor system 104 may determine whether a condition of the vehicle is not normal. The condition may not be normal inside the vehicle when the system receives a signal of a condition. The condition may be caused by one or more objects (e.g., human beings) including a dispute, an oral argument, or a physical fight. The condition may cause a driving safety concern. The condition may also be a concern of passenger or driver safety inside the vehicle. In some embodiments, the sensor system 104 may detect a condition, such as a potentially unsafe condition, based on image data or other data. In some examples, the sensor system 104 may analyze an image or recording of driver and/or passenger movements or actions, such as fighting, hand gestures, facial expressions, and/or body movements. In some examples, the sensor system 104 may detect a condition based on a presence of certain objects such as weapons that the driver and/or passenger may be carrying. In some examples, the sensor system 104 may detect a condition based on a voice level, tone, or pitch, or a change or rate of change in voice level, tone, or pitch. For instance, the sensor system 104 may infer a condition by detecting sudden changes in voice level. In some examples, the sensor system 104 may detect a condition based on a rate of increase of activity in the vehicle, such as a sudden change in temperament, noise level, body movements, or facial expressions. In some embodiments, the sensor system 104 may notify the condition adjustment system 106 that the condition in the vehicle 102 may need to be adjusted or resolved.

In some embodiments, the condition resolving system 106 may be a module. In some embodiments, the condition resolving system 106 may select from one of: physical resolving methods or psychological resolving methods or a combination of the physical and psychological resolving methods. In some embodiments, the condition resolving system 106 may determine which methods to use in resolving the condition inside the vehicle. In some embodiments, the condition resolving system 106 may determine levels of severity of the condition. In some embodiments, the sensor system 104 may infer a presence, existence, or possibility of a condition and the condition resolving system 106 may infer a severity of the condition. In some embodiments, the condition resolving system 106 may determine how severe a condition is based on a rate of increase of activity in the vehicle, such as a sudden change in temperament, noise level, body movements, or facial expressions. In some embodiments, the condition resolving system 106 may determine how severe a condition is based on driver and/or passenger movements or actions, such as fighting, hand gestures, facial expressions, and/or body movements. In some examples, the condition resolving system 106 may detect a severity of a condition based on a presence of certain objects such as weapons that the driver and/or passenger may be carrying. In some examples, the condition resolving system 106 may detect a severity of a condition based on a voice level, tone, or pitch, or a change or rate of change in voice level, tone, or pitch. For instance, the condition resolving system 106 may infer a condition by detecting sudden changes in voice level. The levels of severity of the conditions. may comprise a first level (lowest severity), and a second level (more serious). For example, the condition resolving system 104 may infer a condition of a physical fight between passengers in the vehicle 102 as more serious than a condition of an oral argument between passengers inside the vehicle 102. As another example, the condition resolving system 106 may receive a volume of an oral argument. The level of severity may be determined based on the volume of the oral argument. If the volume of the oral argument inside the vehicle exceeds a threshold, the condition resolving system 106 may determine that the condition inside the vehicle 102 is severe (e.g., a second level).

In some embodiments, the condition resolving system 106 may be configured to determine one or more strategies to be implemented in the vehicle 102 in response to a determined level of the condition. The condition resolving system 106 may implement one strategy in response to the determined level of the condition. The condition resolving system 106 may also implement two or more strategies at the same time in response to the determined level of the condition. The strategies may include a psychological method, a physical method, or a combination of the psychological method and the physical method.

In some embodiments, the psychological method may include playing music that can calm down a condition (e.g., calm down passengers in the dispute inside the vehicle), changing a color of an interior of the vehicle (e.g. ambient light that calms down passengers, or alleviate a condition), releasing a scent such as a relaxing scent, draft of air, mist, or water spray inside the vehicle, or contacting one or more external systems to resolve the condition inside the vehicle.

In some embodiments, the condition resolving system 106 may contact the one or more external systems to report the condition in the vehicle. The external system may be an interactive system that can analyze a status of the condition. The external system may produce, based on the analyzed status of the condition, an artificial voice. For example, the external system may produce an artificial voice to comfort the passengers who have dispute inside the vehicle. The external system may also contact an outsourced or outside consultant to help resolving the condition (e.g. fight, dispute, etc) inside the vehicle. In some embodiments, when the external system receives a notification of the condition, it may alert an authority (e.g., police) or alert objects (e.g., pedestrians, vehicles) surrounding the vehicle for safety purposes. The external system may utilize artificial intelligence (AI) to analyze a severity or nature of the condition. The external system may be integrated in the vehicle or be supported on a server or web based application.

In some embodiments, the physical method may include creating a physical barrier between seats inside the vehicle. The physical barrier also may include releasing a curtain or a wall to divide the interior of the vehicle. The wall may be a bulletproof wall, depending on a severity of the condition. The physical method may comprise rotating one or more occupied seats away from one or more other occupied seats. In some embodiments, the condition resolving system may notify an authority if the level of severity of the condition is high, or has a level of severity or seriousness beyond a threshold.

In some embodiments, when the sensor system 104 determines that there is a condition inside the vehicle 102, the condition resolving system 106 may determine that the condition is relatively not serious, and determine to implement a strategy in response to the condition. For example, the sensor system may determine that an oral argument caused by one or more passengers inside the vehicle is a mild condition (i.e. first level of the condition), and determine that a first, non-drastic strategy should be implemented into the system to resolve the condition. The first strategy may a non-drastic method to resolve the first level of the condition. For example, the sensor system 104 may implement playing a music to calm down or relax the passengers. If the sensor system 104 determines that the condition inside the vehicle is at a second level (e.g., a serious condition), the condition resolving system 106 may implement a second strategy in the vehicle. For example, the sensor system 104 may implement playing a music to calm down the passengers, and at the same time, implement a physical method to create a physical barrier between the seats inside the vehicle to separate the passengers.

In some embodiments, the control resolving system 106 may assess whether a strategy implemented in response to a determined level of the condition resolves the condition. If the condition is determined to be unresolved by the strategy, the control resolving system 106 may implement a new strategy. In some embodiments, if the condition is determined to be unresolved by the first strategy, the control resolving system 106 may add another strategy such that two strategies are implemented simultaneously to resolve the condition.

For example, the control resolving system 106 may determine that a psychological strategy should be implemented in response to a mildest level of the condition. After the psychological method is implemented inside the vehicle, the control resolving system 106 may assess whether the condition is resolved. If the condition is unresolved or only partially resolved, the control resolving system 106 may implement one or more additional strategies (e.g., contact an external system for help) in the vehicle to resolve the condition. If the condition is only partially resolved, the control resolving system 106 may continue implementing the current strategy and/or implement one or more additional strategies designed for relatively non-serious conditions, such as playing music or applying a scent in the vehicle.

The sensor data processing system 108 may function to process sensor data to sense an environment surrounding a vehicle and/or cause a vehicle to perform one or more vehicle driving actions such as autonomous driving actions (or, simply, "driving actions"). For example, the sensor data processing system 108 may process data captured at different times or from different sensor modalities to make the data compatible or suitable for comparison. In some embodiments, the sensor data processing system 108 may analyze sensor data to identify objects (e.g., passengers or drivers) in the vehicle. The sensor data processing system 108 may process the sensor data to separate any boundaries (such as between natural objects, for example, grass and road, sky and mountain, sky and ground). As used herein, driving actions may include controlling braking, acceleration, and/or steering without real time human input. Furthermore, as used herein, "real time human input" is intended to represent a human input that is needed to concurrently control wheel movement of a non-self-driving vehicle, such as gear shifting, steering control, braking pedal control, acceleration pedal control, crutch pedal control, and so on. The sensor data processing system 108 may be implemented as a central computing system of an autonomous vehicle.

In some embodiments, the sensor data processing system 108 may include filtering functionality. In various embodiments, the sensor data processing system 108 may not include filtering functionality. This may allow, for example, the sensor data processing system 108 to be implemented using less powerful components (e.g., slower processors, less memory, and/or the like), and still achieve all of the functionality of a vehicle such as an AV. In various embodiments, the filtering functionality is provided separately (not shown).

The communications network 110 may represent one or more computer networks (e.g., LAN, WAN, bus, or the like) or other transmission mediums. The communication network 110 may provide communication between the vehicle 102, systems 104-108 and/or other systems/engines described herein. In some embodiments, the communication network 110 may include one or more computing devices, routers, cables, buses, and/or other network topologies (e.g., mesh, and the like). In some embodiments, the communication network 110 may be wired and/or wireless. In various embodiments, the communication network 110 may include the Internet, one or more wide area networks (WANs) or local area networks (LANs), one or more networks that may be public, private, IP-based, non-IP based, and so forth.

Figure 2:
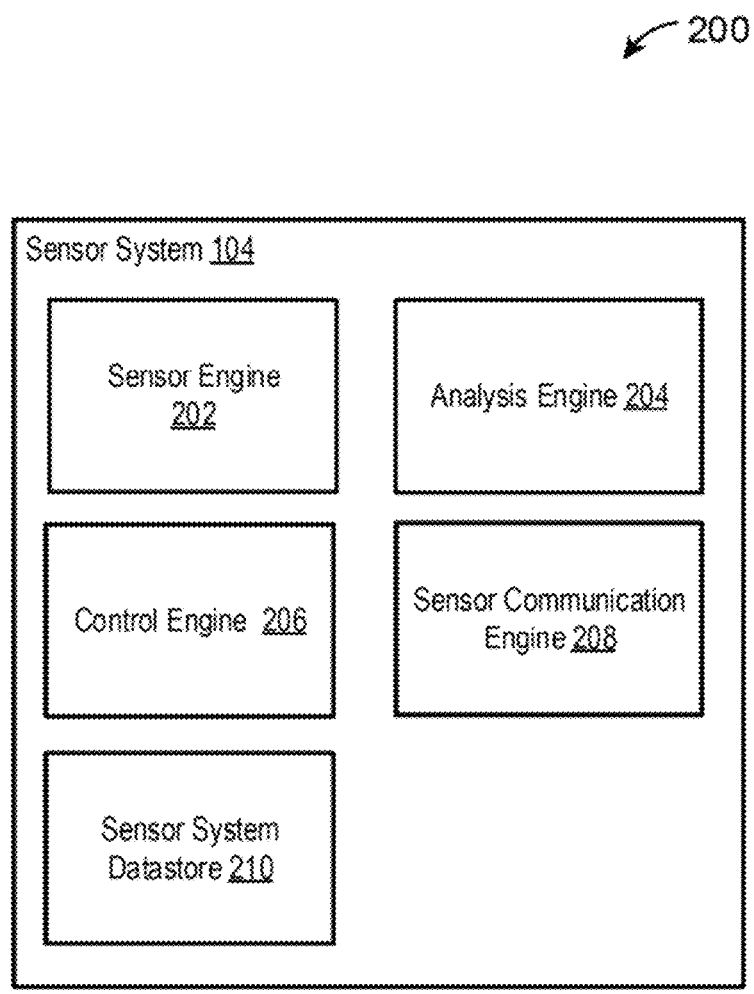
FIG. 2 depicts a diagram of an example of a vehicle sensor system according to some embodiments, in accordance with some embodiments.

FIG. 2 depicts a diagram of a sensor system 200 that may be implemented as sensor system 104 in accordance with some embodiments. In the example of FIG. 2, the sensor system 200 may include a sensor engine 202, an analysis engine 204, a control engine 206, a sensor communication engine 208, and a sensor system datastore 210.

The sensor engine 202 may function to capture sensor data in the vehicle or surrounding the vehicle. The sensor engine 202 may include one or more sensors. The sensors may include laser scanning systems (e.g., Lidar systems), radar systems, cameras, GPS, sonar, ultrasonic, IMU, and FIR (far infrared) sensors and/or the like.

In some embodiments, the sensors may include a rotatable laser scanning system. The rotatable laser scanning system may include a laser, scanner and optics, photodetector and receiver electronics, and position and navigation systems. The rotatable laser scanning system may project light (e.g., pulsed laser light) on regions surrounding a vehicle such as an autonomous vehicle (e.g., an autonomous vehicle the rotatable laser scanning system is mounted on), and measure the reflected pulses. The reflected pulses may be used to generate representations (e.g., 3D representations) of the regions surrounding the autonomous vehicle. The rotatable laser scanning system may rotate 360 degrees in order to capture sensor data for the regions surrounding inside vehicle such as the autonomous vehicle. In some embodiments, cameras may be mounted inside the vehicle such as an AV to capture images (or, image data) of physical actions inside the vehicle.

The analysis engine 204 may be configured to analyze whether the condition inside the vehicle needs to be resolved. The condition needs to be resolved if the condition has a level of severity above a threshold, that may cause a safety issue during the driving. The condition may need to be resolved when the condition is a dispute, an oral argument, or a physical fight.

In some embodiments, the analysis engine 204 may analyze a condition based on sensor data received from the sensor. In some embodiments, the sensor data may include an image captured from the sensor, or one or more specific features (such as objects (e.g., persons) having physical fights or facial expression of passengers inside the vehicle) extracted from the image. The sensor data may be compared with previous data, reference data, and/or historical data, which may refer to, as an example, an image, or one or more specific features of the image. Historical data may be information already verified to be accurate. Historical data may be images from other sensors and/or onboard 3D map data. For example, the previous data, reference data, and/or historical data may comprise a normal or neutral facial expression, or an angry, agitated, or stressed facial expression. The analysis engine 204 may compare the current sensor data such as the current facial expression of one or more passengers with previous data or reference data of normal or neutral facial expression and/or an angry, agitated, or stressed facial expression. Thus the analysis engine 204 may determine whether the current facial expression is normal or neutral, or angry, agitated, or stressed.

In some embodiments, the analysis engine 204 may obtain information resulting from further processing of the sensor data to determine whether any unrelated data are present (such as volume of music played in the vehicle). In some embodiments, one or more unrelated data may be recognized by the analysis engine, and the analysis engine may determine that the unrelated data may not have an impact on the level of severity of the condition inside the vehicle. For example, the analysis engine 204 may receive data of music played inside the vehicle. The analysis engine may determine that the data of the music inside the vehicle is not a factor of condition inside the vehicle (i.e., the music played inside the vehicle is not relevant to a stressful level) and may not use the unrelated data as a parameter to compare to the historical data.

In some embodiments, the analysis engine 204 may compare the sensor data and the historical data based on the sizes of the respective objects in the sensor data and the historical data. In some embodiments, the analysis engine 204 may compare sensor data obtained from the smaller objects (e.g. kids, pets) with the historical data obtained from the similar smaller objects. For example, the analysis engine 204 may not use the historical data of large objects (i.e. adults) as a comparison with the sensor data obtained from the kids inside the vehicle.

For example, the analysis engine 204 may determine whether a feature on the series of images is determined to be continuously changing or moving (e.g. whether the sensor data is smooth). If the feature is not determined to be moving inside the vehicle (i.e. smooth data), the analysis engine 204 may not determine an existence of a condition. Thus, the analysis engine may compare the smoothness rate to a reference value, in order to determine whether a condition exists. In some embodiments, the analysis engine 204 may determine a level of movement relative to movement of the vehicle. The analysis engine 204, as an example, may take into account bumpiness of a road in detecting movement of persons or objects in a vehicle.

The sensor control engine 206 may function to control the sensor engine 202. More specifically, the sensor control engine 206 may function to control the one or more sensors of the sensor engine 202, and/or components thereof. In some embodiments, the sensor control engine 206 may control a rotatable laser scanner system to selectively capture sensor data. Similarly, the sensor control engine 206 may function to not capture certain sensor data. For example, the cameras may be powered off, controlled to not capture images, controlled to delete and/or not store captured images, and/or the like. In some embodiments, the control engine may function to capture certain images from the sensors if the analysis engine 204 determines that there is condition, especially stressful condition, inside the vehicle.

The sensor communication engine 208 may function to send requests, transmit and, receive communications, and/or otherwise provide communication with one or a plurality of systems. In some embodiments, the sensor communication engine 208 may function to encrypt and decrypt communications. The sensor communication engine 208 may function to send requests to and receive data from one or more systems through a network or a portion of a network. Depending upon implementation-specified considerations, the sensor communication engine 208 may send requests and receive data through a connection, all or a portion of which may be a wireless connection. The sensor communication engine 208 may request and receive messages, and/or other communications from associated systems.

Communications may be stored at least temporarily (e.g., cached and/or persistently) in the sensor system datastore 210. For example, the lookup table may be stored in the sensor system datastore 210. As another example, the historical data, the known parameters, and/or thresholds (e.g., first threshold, second threshold, third threshold, fourth threshold) may be stored in the sensor system datastore 210. In some embodiments, the sensor system datastore 210 may be a memory.

Figure 3:
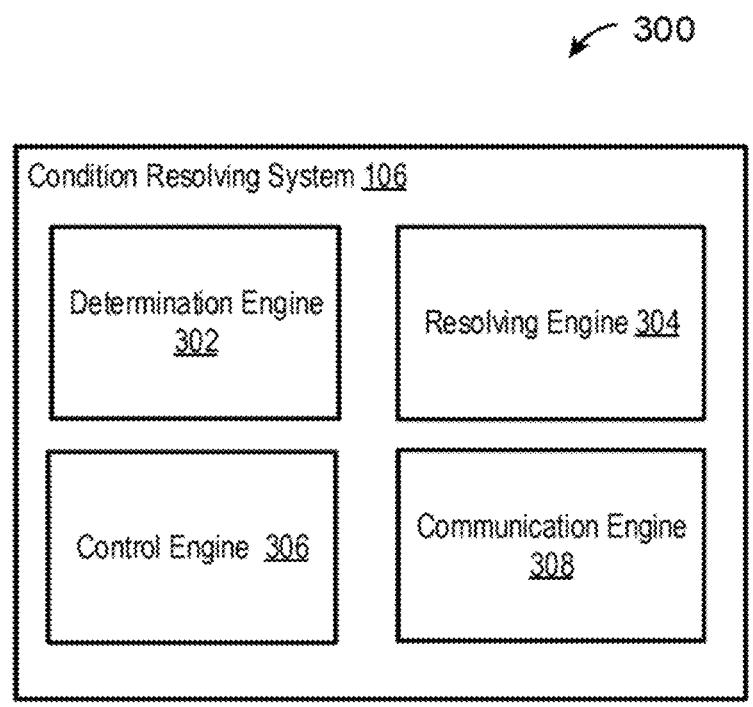
FIG. 3 depicts a diagram of an example of a vehicle condition adjustment system according to some embodiments, in accordance with some embodiments.

FIG. 3 illustrates a diagram of a condition resolving system 300 that may be implemented as condition resolving system 106 in accordance with some embodiments. In the example of FIG. 3, the condition resolving system 106 may include a determination engine 302, a resolving engine 304, a control engine 306, and an error handling communication engine 308.

The determination engine 302 may function to determine a severity of a condition, and which resolving method or sequence of methods to perform. The determination engine 302 may select a resolving method or combination of methods that provide a most efficient way to resolve the condition inside the vehicle. In some embodiments, the determination engine 302 may select a resolving method or methods based on the level of seriousness of the condition inside the vehicle. The determination engine 302 may select a resolving method that has had a highest previous or historical rate of success to resolve the condition or similar conditions. The determination engine 302 may also determine different resolving methods for a condition, and if a resolving method does not resolve the condition, the determination engine 302 may select another resolving method.

For example, the determination engine 302 may select a psychological method to resolve a non-severe level of condition (e.g., oral dispute or a non-physical interaction) inside the vehicle. The resolving engine 304 may play music to relax the passengers who are having an oral dispute. If the determination engine 302 determines that the condition is not resolved by playing music, the determination engine 302 may select another method, for example, changing a color of an interior of the vehicle. The determination engine 302 may turn the color to ambient light such that the condition may be lessened or resolved. A speed at which the color is changed to ambient light may be based on a severity of the condition. For example, as a severity of the condition increases, the speed at which the color is changed will also increase.

In some embodiments, in response to the condition being determined to be unresolved by a psychological method, the determination engine 302 may determine whether the condition requires an immediate physical method. A physical method may be required immediately if the determination engine 302 determines that the condition inside the vehicle is worse or not improved by using a psychological method. For example, when the condition involves a physical fight inside the vehicle, and the determination engine 302 may select a psychological method first to evaluate whether the condition may be improved. If the condition is not improved or the status of a physical fight is exacerbated, the determination engine 302 may determine to immediately use a physical method, for example, a method involving a physical separation such as a physical barrier, to prevent passengers from touching each other. In some embodiments, if the condition involves a physical interaction inside the vehicle, the determination engine 302 may initially select a method that involves a physical barrier such as constructing a wall or rotating seats away from one another.

In some embodiments, after determining that the condition inside the vehicle is serious, or the level of seriousness is high, for example, in a case of a serious physical fight, the determination engine 302 may select a physical method directly to prevent any physical interaction inside the vehicle. If the physical fight is resolved by the physical method but a condition still exists, for example, if facial expressions of persons are still tense, the determination engine 302 may, based on the condition inside the vehicle, select one of psychological methods to mitigate the condition.

In some embodiments, the determination engine 302 may be configured to determine whether to contact external systems to resolve the condition. If the determination engine 302 determines that none of the methods, including psychological or physical methods, may resolve the condition inside the vehicle (e.g., the level of seriousness is extreme), the determination engine 302 may contact external systems to resolve the condition.

In some embodiments, the determination engine 302 may, based on the level of seriousness of the condition, initiate shut down of the vehicle, such as an AV, if the level of the seriousness or severity is high. In some embodiments, the determination engine may be configured to determine to reduce the speed of the vehicle if the condition may affect safety of the driving. As another example, if there is a physical fight between a driver and a passenger, the determination engine may initiate shut down of the vehicle, such as an AV, if the condition is not resolved by other methods. As another example, if there is a physical fight between a driver and a passenger, the determination engine may reduce the driving speed of the vehicle such that the passenger or the driver may be alerted about the condition.

The resolving engine 304 may be configured to perform the method or methods as determined by the determination engine 302. In some embodiments, the resolving engine 304 may be configured to execute a psychological or physical method, or one or more strategies. For example, the resolving engine 304 may be configured to play music or release scent, mist, draft of air, water or shower, based on detection of intensity inside the vehicle. As another example, the resolving engine 304 may be configured to activate a physical barrier such as a bulletproof barrier to separate passengers based on detection of physical action.

The control engine 306 may function to control the determination engine 302 or the resolving engine 304. More specifically, the control engine 306 may function to control one or more components of the determination engine 302 or the resolving engine 304.

The communication engine 308 may function to send requests, transmit and, receive communications, and/or otherwise provide communication with one or a plurality of systems. In some embodiments, the communication engine 308 functions to encrypt and decrypt communications. The communication engine 308 may function to send requests to and receive data from one or more systems through a network or a portion of a network. Depending upon implementation-specified considerations, the sensor communication engine 308 may send requests and receive data through a connection, all or a portion of which may be a wireless connection. The communication engine 308 may request and receive messages, and/or other communications from associated systems.

Figure 4:
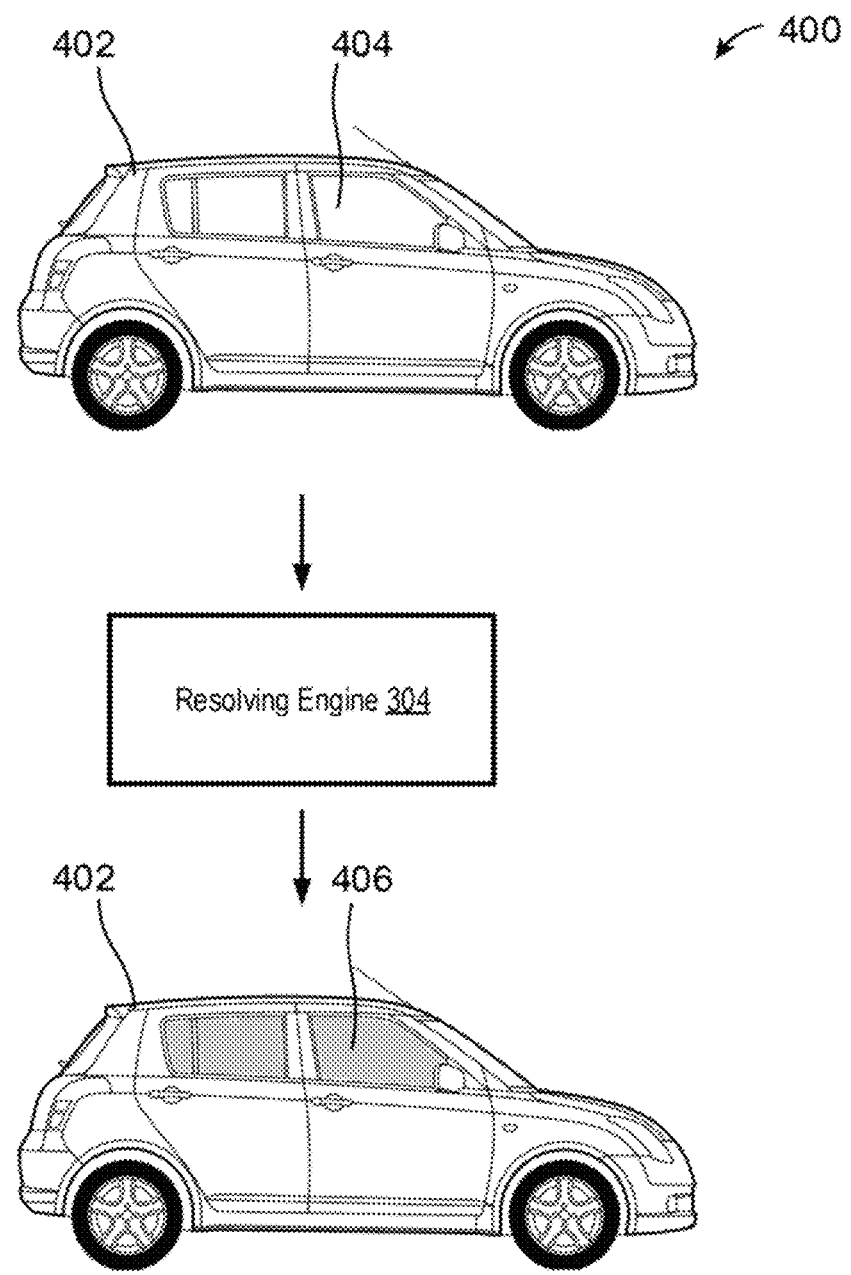
FIG. 4 depicts a diagram for providing vehicle condition adjustment, in accordance with some embodiments.

FIG. 4 illustrates a diagram 400 of a vehicle 402 in response to a condition in the vehicle 402, in accordance with some embodiments. The vehicle 402 may have natural lighting 404 when the vehicle is in a normal condition (i.e., default condition). The vehicle 402 may implement one or more strategies when a condition is detected in the vehicle 402. A condition resolving system such as condition resolving system 106 may determine levels of severity of a condition inside the vehicle 402, and determine one or more strategies to be executed inside the vehicle 402. In some embodiments, the condition resolving system may implement psychological strategies or physical strategies. The condition resolving system may execute a psychological strategy for a mild, non-severe condition inside the vehicle, and implement a physical strategy for a more severe condition. The system may also execute both psychological and physical strategies at the same time.

For example, as shown in FIG. 4, when the condition resolving system determines that there is a stressful condition inside the vehicle 402, the condition resolving system may determine levels of a stressful condition. If the condition resolving system determines that the condition is not serious, a resolving engine, for example, the resolving engine 304, may change colors of an interior of the vehicle. The resolving engine 304 may turn the color to ambient light 406 such that the lighting may relax the atmosphere in the vehicle 402, thereby resolving the condition. The ambient light 406 may have a psychological effect on the objects in the vehicle. In some embodiments, the resolving engine 304 may implement different psychological strategies in response to a condition in the vehicle. For example, when the resolving engine 304 determines that there is an oral dispute inside the vehicle 402, the resolving engine 304 may play music, release relaxing scent, or contact one or more external systems to resolve the condition. In some embodiments, in an event of an oral dispute inside the vehicle The resolving engine 304 may contact one or more external systems to resolve the condition in the vehicle. The external systems may alert an authority, for example, a police station, about the condition of the vehicle 402. For instance, if the resolving engine 304 determines there is a physical fight in the vehicle, the system may contact a police such that the police may monitor the safety of the vehicle and its environment. In some embodiments, the external system may alert objects (e.g., vehicles, pedestrians) nearby the vehicle such that the objects may stay away from the vehicle. For example, if the resolving engine 304 determines there is a condition in the vehicle that may affect vehicle safety, the system may contact an external system. The external system may alert pedestrians nearby the vehicle, preventing the pedestrians from walking close to the vehicle.

In some embodiments, when the condition is resolved inside the vehicle 402, and no other condition is present, the resolving engine 304 may stop the implementation such that the vehicle 402 may return to the original status (i.e., default condition), For example, the light may be changed to ambient light 406 when the condition is present inside the vehicle 402. When the condition is determined to be resolved, the resolving engine 304 may change the light from ambient light 406 to normal lighting (i.e., default natural light 404). In some embodiments, the resolving engine 304 may switch strategies in response to a condition inside the vehicle 402. For example, when the resolving engine 304 determines that that the condition inside the vehicle 402 is serious or severe (e.g., a physical fight between passengers), the physical method may be executed, for example, a physical barrier between the passengers, to separate the passengers. When the resolving engine 304 determines that the condition inside the vehicle 402 is improved, for example, from a physical fight to an oral dispute, the resolving engine 304 may change strategies to resolve the condition. The resolving engine 304 may stop the physical barrier between the passengers, and switch the strategy to a psychological method, for example, playing music to resolve the condition inside the vehicle. The selection of music may be based on a genre or specific piece of music that has a highest rate of success for a specific passenger or passengers in helping to reduce or eliminate the condition. In some embodiments, the selection of music may be based on a genre or specific piece of music that has a highest rate of success in resolving (completely or partially) a condition of a particular level of severity.

Figure 5:
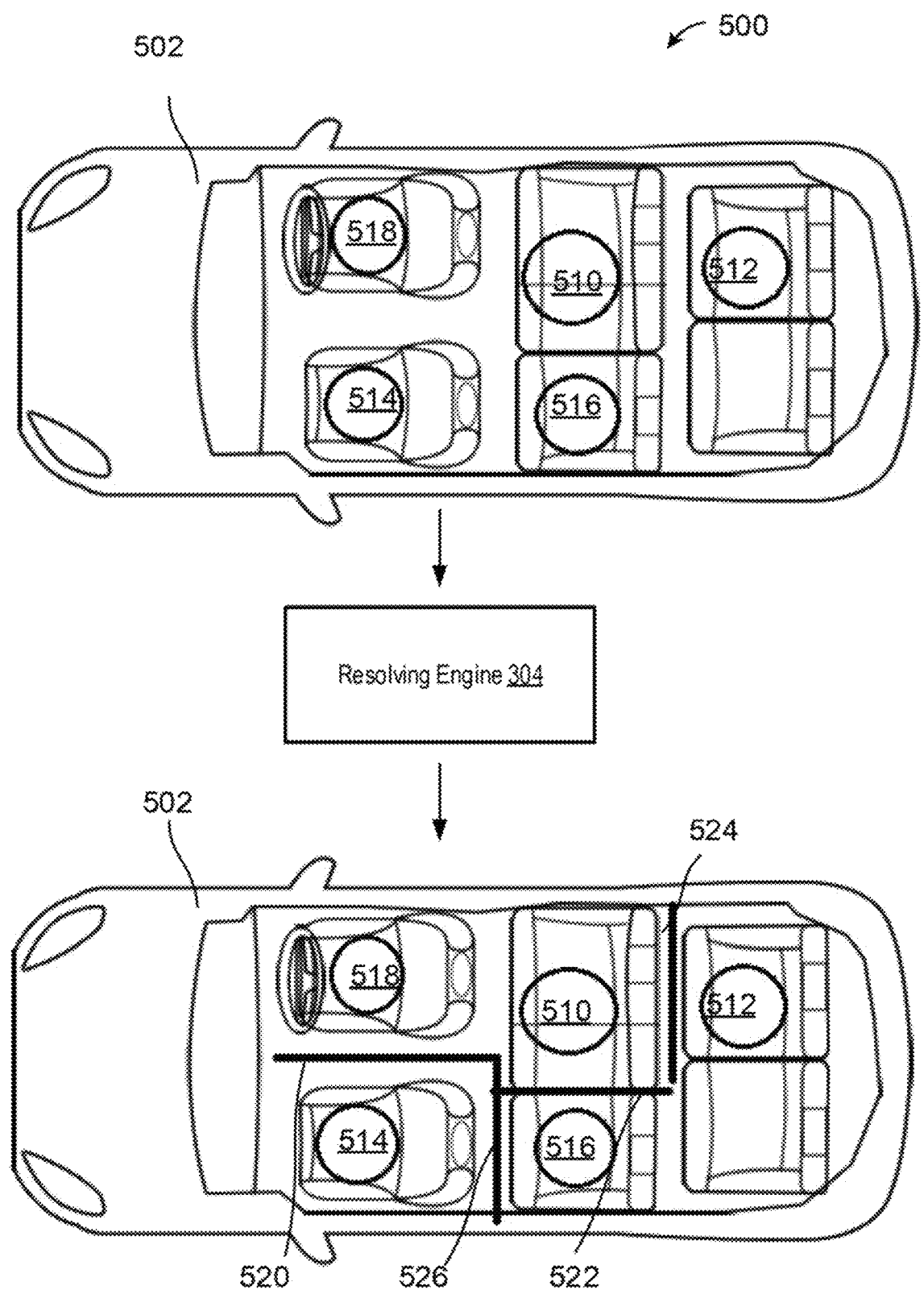
FIG. 5 depicts a diagram for providing vehicle condition adjustment, in accordance with some embodiments.

FIG. 5 illustrates a diagram of a vehicle in response to a condition inside the vehicle, in accordance with some embodiments. The vehicle 502 may have passengers 510, 512, 514, 516 and a driver 518 inside the vehicle. The driver 518 may be facing a steering wheel. In some embodiments, a driver may be seated in a position corresponding to 514 and the steering wheel may be located on a left side rather than a right side as shown. In some embodiments, the vehicle 502 may not have a steering wheel. The passenger 514 may sit at the front row next to a driver's seat. The passenger 510, 516 may sit in the middle row, and the passenger 512 may sit at the back of the vehicle 502. A sensor system such as sensor system 104 inside the vehicle 502 may determine whether there is a condition. A resolving engine such as resolving engine 304, may receive a notification to implement one or more strategies to resolve the condition and implement the one or more strategies after the resolving engine determines a severity of the condition inside the vehicle 502.

Various strategies may be implemented inside the vehicle 502 to resolve the condition. In particular, if the condition is serious, a physical method may be implemented by the resolving engine 304. The condition may be determined to be serious if there is a physical action between passengers inside the vehicle. The physical action may be a physical fight, or a violent behavior between the passengers. The physical method may include creating a physical barrier 520, 522, 524, 526 between passengers who are in the physical fight. The physical barrier 520, 522, 524, 526 may be a curtain or a wall that may divide the seats of the vehicle 502. For example, as shown in FIG. 5, if the passenger 510 is having a physical fight with the passenger 516, the resolving engine may create a wall 522 to separate the passengers, such that the passengers 510 and 516 may be prevented from having a physical contact with each other. As another example, if the passenger 510 is having a physical fight with the passenger 512, a wall 524 may be created to separate the middle row and the back row of the vehicle 502. In some embodiments, the wall 524 may partially block access between passengers 510 and 516, or between the middle row and back row of the vehicle 502. For example, the wall 524 may only be partially erected rather than completely erected to block access between passengers, or between a passenger and driver. In some embodiments, a speed at which the wall 524 is constructed may be based on a level of severity of the condition. In some examples, a higher the severity of the condition, a higher the speed at which the wall 524 is constructed. In some embodiments, the wall 524 may be cyclically constructed and deconstructed (e.g., removed) at a given frequency. For example, the wall 524 may be constructed to block access for five seconds and then may be removed for five seconds so there is no barrier between passengers or between a passenger and a driver. The frequency at which the wall 524 is cyclically constructed and deconstructed may be based on a level of severity of the condition. In some examples, a higher the severity of the condition, a higher the frequency at which the wall 524 is constructed and deconstructed. In some embodiments, the resolving engine may turn the seats away such that the passengers can be faced away from each other. An angle, a speed, or an acceleration at which the seats are turned away may be based on a level of severity of the condition. For example, a higher the severity of the condition, a higher the angle, the speed, or the acceleration at which the seats are turned away.

In some embodiments, the resolving engine may create a physical barrier to separate the driver 518 from other passengers in the vehicle if there is a condition inside the vehicle that may affect the driver's driving action. The resolving engine may determine that a condition (e.g., an oral dispute or a physical fight) is nearby the driver or the driver's seat that may affect the driver's driving action. The resolving engine may create a physical barrier (e.g., a curtain or a wall) to divide the driver 518 from other passengers in response to the condition inside the vehicle 502. The physical barrier to divide the driver 518 from the stressful condition may be created even in a mild level of condition (e.g., an oral dispute) such that the driver 518 may concentrate on driving without being affected by the stressful condition. For example, if the passenger 516 is having a physical fight with the passenger 514, the resolving engine may not only create a wall 526 to divide the passengers 516 and 514, but also create a wall 520, separating the driver 518 from the passenger 514 such that the driver 518 may not be affected by the physical fight inside the vehicle 502.

Figure 6:
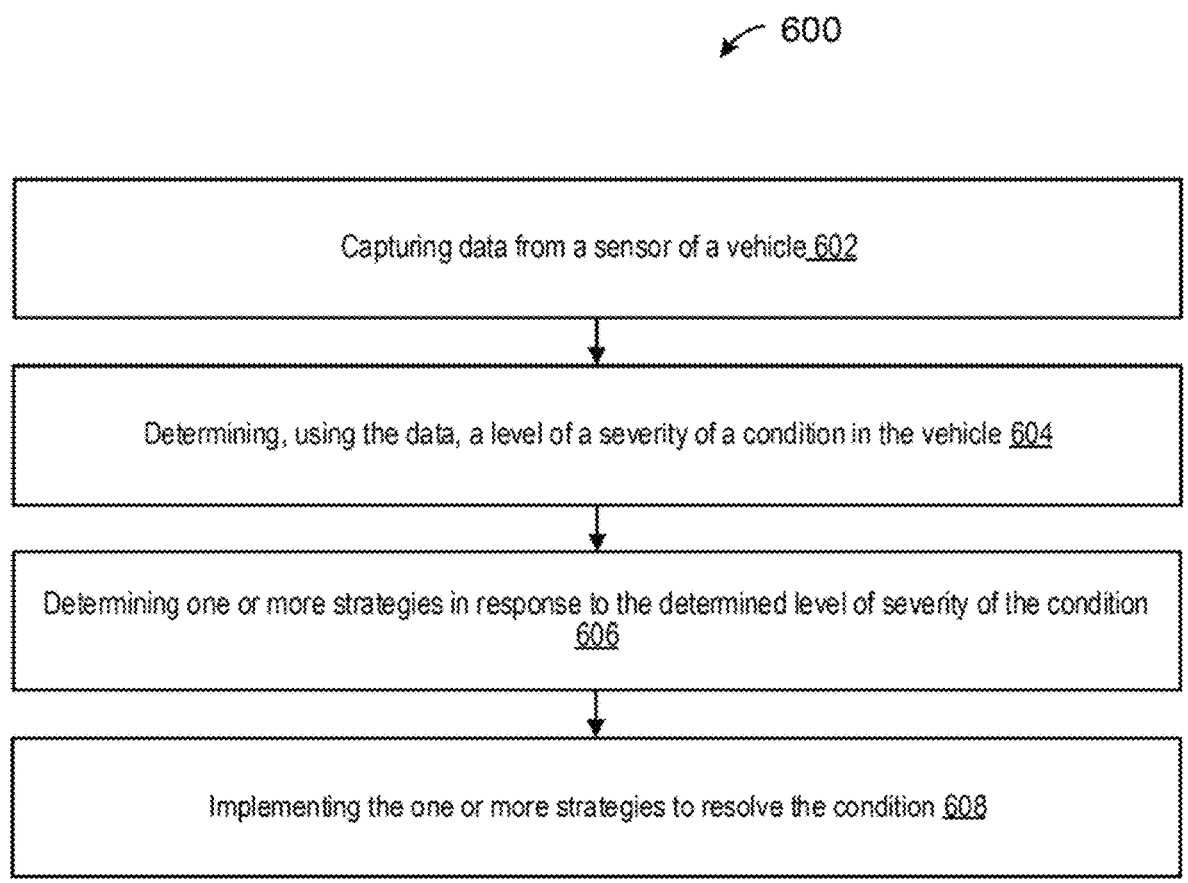
FIG. 6 depicts a flowchart of an example of an example method, in accordance with some embodiments.

FIG. 6 illustrates a flowchart 600 of a method example of implementing one or more strategies in response to a condition inside a vehicle, in accordance with some embodiments. In this and other flow flowcharts, the flowchart 600 illustrates by way of examples a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity. The description from other FIGS. is also applicable to FIG. 6. The example method 600 may be implemented in various computing systems or devices including one or more processors.

In step 602, a sensor system (e.g., sensor system 104) may capture data from a sensor inside a vehicle. As used herein, sensors may include laser scanning systems (e.g., Lidar systems), radar systems, cameras, GPS, sonar, ultrasonic, IMU, and FIR (far infrared) sensors and/or the like.

In step 604, a condition or potential condition may be detected in a vehicle. In step 606, a level of severity of the condition inside the vehicle may be determined based on the received sensor data, for example, by an analysis engine. The analysis engine may determine the level of seriousness of the condition inside the vehicle.

In step 608, one or more strategies may be determined in response to the determined level of severity of the condition. In step 610, the one or more strategies may be implemented to resolve the condition. A physical method may be implemented if the level of severity of the condition is high, and a psychological method may be implemented otherwise. In some embodiments, multiple strategies may be implemented (e.g., implementing both psychological and physical method) to resolve the condition.

Figure 7:
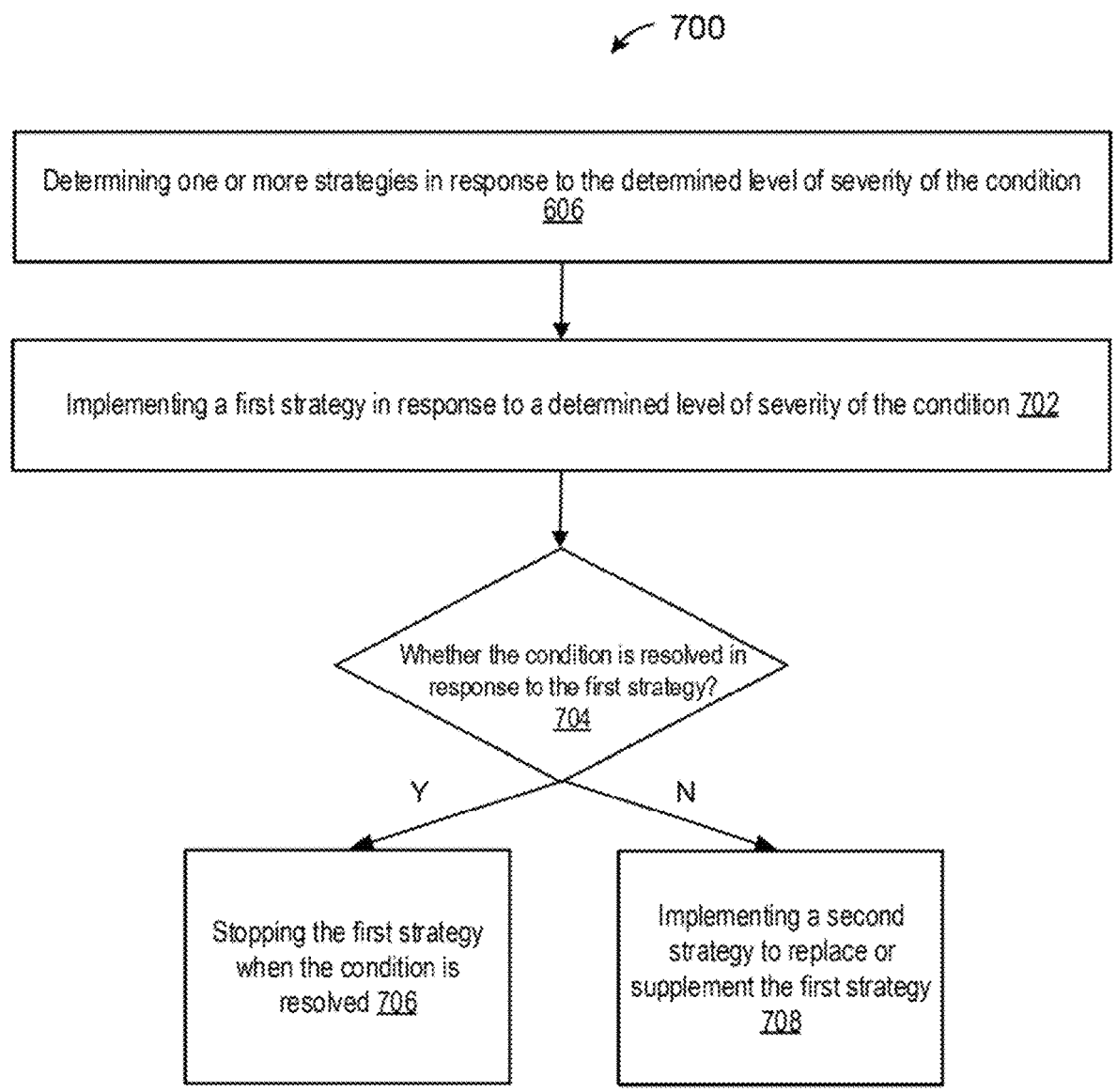
FIG. 7 depicts a flowchart of an example of an example method, in accordance with some embodiments.

FIG. 7 illustrates a flowchart of an example of determining one or more strategies in response to the determined level of the condition.

In decision 702, a strategy may be implemented (e.g., a psychological method) in response to a determined mild level of severity of the condition. For example, a color of an interior of a vehicle may be changed to resolve a stressful condition, as illustrated in FIG. 4. In decision 704, a determination may be made of whether the condition is resolved in response to the strategy. In decision 706, if the condition is resolved, the strategy may be stopped and a vehicle may be returned to an original status (e.g., turning the interior color of the vehicle back to the original status). In decision 708, if the condition is not resolved by using the strategy as shown in FIG. 4 (e.g., change the color of interior of the vehicle), a stronger or more drastic strategy may be implemented, for example, using a physical method, to resolve the condition.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 8:
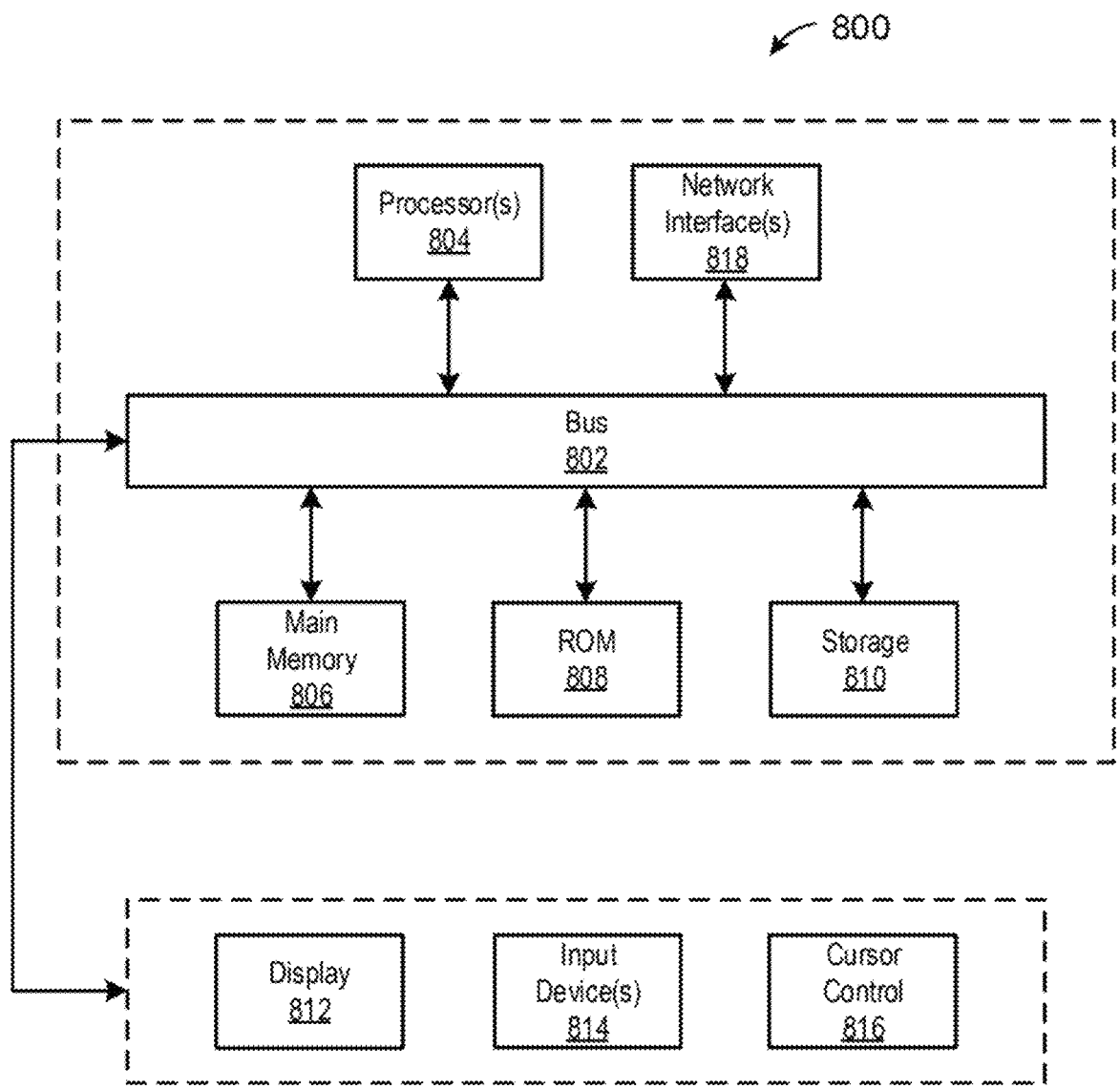
FIG. 8 depicts a diagram of an example computer system for implementing the features disclosed herein.

FIG. 8 is a block diagram that illustrates a computer system 800 upon which any of the embodiments described herein may be implemented. The computer system 800 includes a bus 802 or other communication mechanism for communicating information, one or more hardware processors 804 coupled with bus 802 for processing information. Hardware processor(s) 804 may be, for example, one or more general purpose microprocessors.

The computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

The computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

The computer system 800 may be coupled via bus 802 to output device(s) 812, such as a cathode ray tube (CRT) or LCD display (or touch screen), for displaying information to a computer user. Input device(s) 814, including alphanumeric and other keys, are coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may retrieves and executes the instructions. The instructions received by main memory 806 may optionally be stored on storage device 810 either before or after execution by processor 804.

The computer system 800 also includes a communication interface 818 coupled to bus 802. Communication interface 818 provides a two-way data communication coupling to one or more network links that are connected to one or more local networks. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicated with a WAN). Wireless links may also be implemented. In any such implementation, communication interface 818 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 818, which carry the digital data to and from computer system 800, are example forms of transmission media.

The computer system 800 can send messages and receive data, including program code, through the network(s), network link and communication interface 818. In the Internet example, a server might transmit a requested code for an application program through the Internet, the ISP, the local network and the communication interface 818.

The received code may be executed by processor 804 as it is received, and/or stored in storage device 810, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a stand-alone computer system, a client computer system, or a server computer system) or one or more hardware engines of a computer system (e.g., a processor or a group of processors) may be configured by software (e.g., an application or application portion) as a hardware engine that operates to perform certain operations as described herein.

The vehicle system 100 as described may be configured to perform the aforementioned tasks using a different organization or configuration of systems and/or engines. For example, some or all of the separate systems and/or engines described previously may be combined into a single system and/or engine, or further separated into distinct systems and/or engines.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

For example, "is to be" could mean, "should be," "needs to be," "is required to be," or "is desired to be," in some embodiments.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Although the invention(s) have been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The foregoing description of the present invention(s) have been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A vehicle system, comprising:
a sensor configured to capture data, the data comprising a rate of change of a level, tone or pitch of a voice;
one or more processors; and
a memory storing instructions that, when executed by the one or more processors, cause the one or more processors to perform:
 detecting, based on the data, a dispute within the vehicle, the dispute comprising an oral argument or a physical fight;
 determining a level of severity of the dispute;
 determining a first strategy in response to the determined level of severity of the dispute, the first strategy comprising playing music, changing a color of an interior of the vehicle, or releasing a scent inside the vehicle;
 implementing the first strategy;
 determining whether the severity of the dispute has decreased by more than a threshold degree compared to the level based at least in part on facial expressions of participants of the dispute;
 in response to determining that the dispute still remains within the threshold degree of the level, determining a second strategy, the second strategy comprising erecting a physical barrier between seats within the vehicle or rotating the seats away from one another.

2. The system of claim 1, wherein the detecting the condition comprises inferring, based on the data, a behavior of one or more persons in the vehicle.

3. The system of claim 1, wherein the first strategy further comprises contacting one or more external systems to resolve the condition.

4. The system of claim 3, wherein the external system is an interactive system, the interactive system comprising one or more processors and instructions that, when executed by the one or more processors, causes the one or more processors to:
 analyze a status of the condition; and
 produce, based on the analyzed status of the condition, an artificial voice.

5. The system of claim 1, wherein the changing the color of the interior of the vehicle further comprises turning the color to ambient light.

6. The system of claim 1, wherein the second strategy comprises erecting the physical barrier, the erecting of the physical barrier further comprising:
 releasing a curtain or a wall to divide the interior of the vehicle.

7. The system of claim 1, wherein the instructions further cause the one or more processors to perform:
 stopping, when the condition is determined to be resolved, the second strategy.

8. The system of claim 1, wherein the instructions further cause the one or more processors to perform:
 notifying an authority if the condition is not resolved in response to the second strategy.

9. The system of claim 1, wherein the data further comprises a rate of change in a body movement or a facial expression.

10. The system of claim 1, wherein the first strategy comprises changing the color, the changing of the color comprising increasing a speed at which the color is changed as the severity of the dispute increases.

11. The system of claim 1, wherein the first strategy comprises playing music, the playing of the music comprises selecting a genre of music that has a highest previous rate of success in resolving disputes.

12. The system of claim 1, wherein the second strategy comprises erecting a physical barrier, wherein the erecting of the physical barrier comprises increasing a speed at which the physical barrier is erected based on the severity.

13. The system of claim 1, wherein the second strategy comprises erecting a physical barrier, the erecting of the physical barrier comprising cyclically erecting and removing the physical barrier at a frequency depending on the severity of the condition.

14. A method implemented by a vehicle system including one or more processors and storage media storing machine-readable instructions, wherein the method is performed using the one or more processors, the method comprising:
 capturing data from a sensor, the data comprising a rate of change of a level, tone or pitch of a voice;
 determining, using the data, a level of severity of a dispute in the vehicle;
 determining a first strategy in response to the determined level of severity of the dispute, the first strategy comprising playing music, changing a color of an interior of the vehicle, and releasing a scent inside the vehicle;
 implementing the first strategy;
 determining whether the severity of the dispute has decreased by more than a threshold degree compared to the level based at least in part on facial expressions of participants of the dispute;
 in response to determining that the dispute still remains within the threshold degree of the level, determining a second strategy, the second strategy comprising erecting a physical barrier between seats within the vehicle or rotating the seats away from one another.

15. The method of claim 14, wherein the dispute comprises an oral argument or a physical fight.

16. The method of claim 14, wherein the first strategy further comprises contacting one or more external interactive systems.

17. The method of claim 14, further comprising:
analyzing a status of the dispute; and
producing, based on the analyzed status of the dispute, an artificial voice.

* * * * *